United States Patent
Inoue et al.

(10) Patent No.: US 12,255,329 B2
(45) Date of Patent: Mar. 18, 2025

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicants: Panasonic Corporation, Kadoma (JP); SANYO Electric Co., Ltd., Daito (JP)

(72) Inventors: Katsuya Inoue, Hyogo (JP); Takeshi Ogasawara, Osaka (JP); Yoshinori Aoki, Osaka (JP); Shun Nomura, Osaka (JP)

(73) Assignees: PANASONIC HOLDINGS CORPORATION, Osaka (JP); PANASONIC ENERGY CO., LTD., Osaka (JP)

(*) Notice: Subject to any disclaimer, the term of this patent is extended or adjusted under 35 U.S.C. 154(b) by 489 days.

(21) Appl. No.: 17/636,195

(22) PCT Filed: Jul. 28, 2020

(86) PCT No.: PCT/JP2020/028814
§ 371 (c)(1),
(2) Date: Feb. 17, 2022

(87) PCT Pub. No.: WO2021/039239
PCT Pub. Date: Mar. 4, 2021

(65) Prior Publication Data
US 2022/0293931 A1    Sep. 15, 2022

(30) Foreign Application Priority Data
Aug. 30, 2019    (JP) .................................. 2019-158457

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/366* (2013.01); *H01M 4/505* (2013.01); *H01M 2004/028* (2013.01)

(58) Field of Classification Search
None
See application file for complete search history.

(56) References Cited

U.S. PATENT DOCUMENTS

2006/0166091 A1* 7/2006 Deguchi ............... H01M 4/525
                                                             429/231.1
2014/0264158 A1* 9/2014 Reichman ............. H01M 4/505
                                                             252/182.1
(Continued)

FOREIGN PATENT DOCUMENTS

CN        103050686 A        4/2013
CN        109455772 A        3/2019
(Continued)

OTHER PUBLICATIONS

Machin translation of JP 2009128820A. (Year: 2009).*
(Continued)

*Primary Examiner* — Gregg Cantelmo
(74) *Attorney, Agent, or Firm* — WHDA, LLP (57) ABSTRACT

This positive electrode active material for nonaqueous electrolyte secondary batteries comprises a lithium-transition metal composite oxide and a surface modification layer. The lithium transition metal composite oxide contains at least Al and 80 mol % or more Ni with reference to the total number of moles of metal elements excluding Li, and the surface modification layer contains at least Sr and is formed on the surface of primary particles of the lithium-transition metal composite oxide.

10 Claims, 1 Drawing Sheet

(51) Int. Cl.
*H01M 4/36* (2006.01)
*H01M 4/505* (2010.01)

(56) References Cited

U.S. PATENT DOCUMENTS

| | | | |
|---|---|---|---|
| 2019/0260031 A1* | 8/2019 | Kim | H01M 4/625 |
| 2021/0066715 A1 | 3/2021 | Nakayama et al. | |
| 2023/0032577 A1* | 2/2023 | Aoki | H01M 4/0471 |
| 2023/0065418 A1* | 3/2023 | Kawakita | H01M 4/366 |
| 2023/0072002 A1* | 3/2023 | Inoue | C01G 53/50 |
| 2023/0187629 A1* | 6/2023 | Takayama | H01M 4/62 |
| | | | 429/223 |
| 2023/0207794 A1* | 6/2023 | Inoue | C01G 53/40 |
| | | | 429/231.95 |
| 2023/0290941 A1* | 9/2023 | Kanai | H01M 4/485 |

FOREIGN PATENT DOCUMENTS

| | | | |
|---|---|---|---|
| JP | 2009129820 A * | 6/2009 | |
| JP | 5245210 B2 | 7/2013 | |
| JP | 2013-182757 A | 9/2013 | |
| JP | 2013-254639 A | 12/2013 | |
| WO | WO-2017168274 A1 * | 10/2017 | C01G 53/50 |
| WO | 2019/031117 A1 | 2/2019 | |
| WO | 2019/087558 A1 | 5/2019 | |

OTHER PUBLICATIONS

International Search Report dated Oct. 6, 2020, issued in counterpart International Application No. PCT/JP2020/028814 (3 pages).

* cited by examiner

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/028814 filed on Jul. 28, 2020 which claims the benefit of priorities under 35 U.S.C. § 119 (a) of Japanese Patent Application No. 2019-158457 filed in Japan on Aug. 30, 2019, the contents of which are incorporated herein by reference.

TECHNICAL FIELD

The present disclosure relates to a positive electrode active material for non-aqueous electrolyte secondary batteries and a non-aqueous electrolyte secondary battery.

BACKGROUND ART

In recent years, non-aqueous electrolyte secondary batteries comprising positive electrodes, negative electrodes, and non-aqueous electrolytes and being charged and discharged by moving lithium ions, etc., between the positive electrodes and the negative electrodes, have been widely used as secondary batteries having high output and high capacity. From the viewpoint of lowering the resistance and increasing the capacity of the batteries, they are required for improving characteristics of the positive electrode active materials included in the positive electrodes of the batteries.

For example, Patent Literature 1 describes a positive electrode active material having improved charge/discharge cycle characteristics while addressing higher capacity, which is a lithium transition metal composite oxide having a layered structure and including Mn, Ni, Co, Sr, and Mo, wherein a Mo content is 0.1 mol % to 1.5 mol % and a content ratio of Mo to Sr (Mo/Sr) is 0.5 to 2.0 by molar ratio.

CITATION LIST

Patent Literature

PATENT LITERATURE 1: Japanese Patent No. 5245210

SUMMARY

By the way, the lithium transition metal composite oxide included in the positive electrode active material is considered to be designed to increase a Ni content in order to obtain a high discharge capacity. However, in the case of the proportion of Ni to the total number of mole of the metal elements excluding Li is 80 mol % or more, the layered structure of the lithium transition metal composite oxide becomes unstable, which may decrease the battery capacity accompanying charge/discharge. The technique of Patent Literature 1 does not consider a decrease in battery capacity accompanying charge/discharge in the battery having the high Ni content, and still has room for improvement.

Therefore, an object of the present disclosure is to provide a positive electrode active material having a proportion of Ni to a total number of mole of metal elements excluding Li of 80 mol % or more and capable of inhibiting a decrease in battery capacity accompanying charge/discharge.

The positive electrode active material for non-aqueous electrolyte secondary batteries that is one aspect of the present disclosure, is characterized in including a lithium transition metal composite oxide including at least 80 mol % or more of Ni to the total number of mole of metal elements excluding Li, and Al, and a surface modification layer formed on a surface of a primary particle of the lithium transition metal composite oxide and including at least Sr.

The non-aqueous electrolyte secondary battery that is one aspect of the present disclosure is characterized by comprising a positive electrode including the aforementioned positive electrode active material, a negative electrode, and a non-aqueous electrolyte.

According to the positive electrode active material for non-aqueous electrolyte secondary batteries that is one aspect of the present disclosure, it is possible to provide a non-aqueous electrolyte secondary battery of high capacity, capable of inhibiting a decrease in battery capacity accompanying charge/discharge.

DESCRIPTION OF EMBODIMENTS

The layered structure of the lithium transition metal composite oxide has a transition metal layer such as Ni, a Li layer, and an oxygen layer, and the Li ions present in the Li layer reversibly move in and out, so that a charge/discharge reaction of the battery proceeds. Here, in the lithium transition metal composite oxide included in the positive electrode active material, when the proportion of Ni to the total number of mole of metal elements excluding Li is 80 mol % or more, many Li ions are extracted from a Li layer upon battery charge, whereby the layered structure may become unstable. On a surface of the lithium transition metal composite oxide in which the layered structure has become unstable, a deteriorated layer is formed by a reaction with an electrolyte. Since a structural change of the lithium transition metal composite oxide further proceeds at the deteriorated layer as a starting point, a battery capacity gradually decreases accompanying charge/discharge. However, as in the positive electrode active material for non-aqueous electrolyte secondary batteries that is one embodiment of the present disclosure, containing Al and Sr in predetermined amounts inhibits a reaction with an electrolytic solution on a surface by the synergistic effect of Al and Sr and further stabilizes the surface structure. This can inhibit the decrease of battery capacity accompanying charge/discharge. Since Al does not change in oxidation number even during charge/discharge, Al incorporated in the transition metal layer is presumed to stabilize the structure thereof. Moreover, Sr is assumed to enable to render the surface state of the lithium transition metal composite oxide to change by electronic interaction.

An example of the embodiment of the non-aqueous electrolyte secondary battery according to the present disclosure will be described in detail below. In the following, a cylindrical battery in which a wound electrode assembly is housed in a cylindrical battery case is illustrated, however, the electrode assembly is not limited to the wound type, and a plurality of positive electrodes and a plurality of negative electrodes may be alternately stacked one by one with separators interposed therebetween. Further, the battery case is not limited to a cylindrical shape, and may be, for example, a square shape, or a coin shape, or may be a battery case formed of a laminated sheet including a metal layer and a resin layer.

Figure 1:
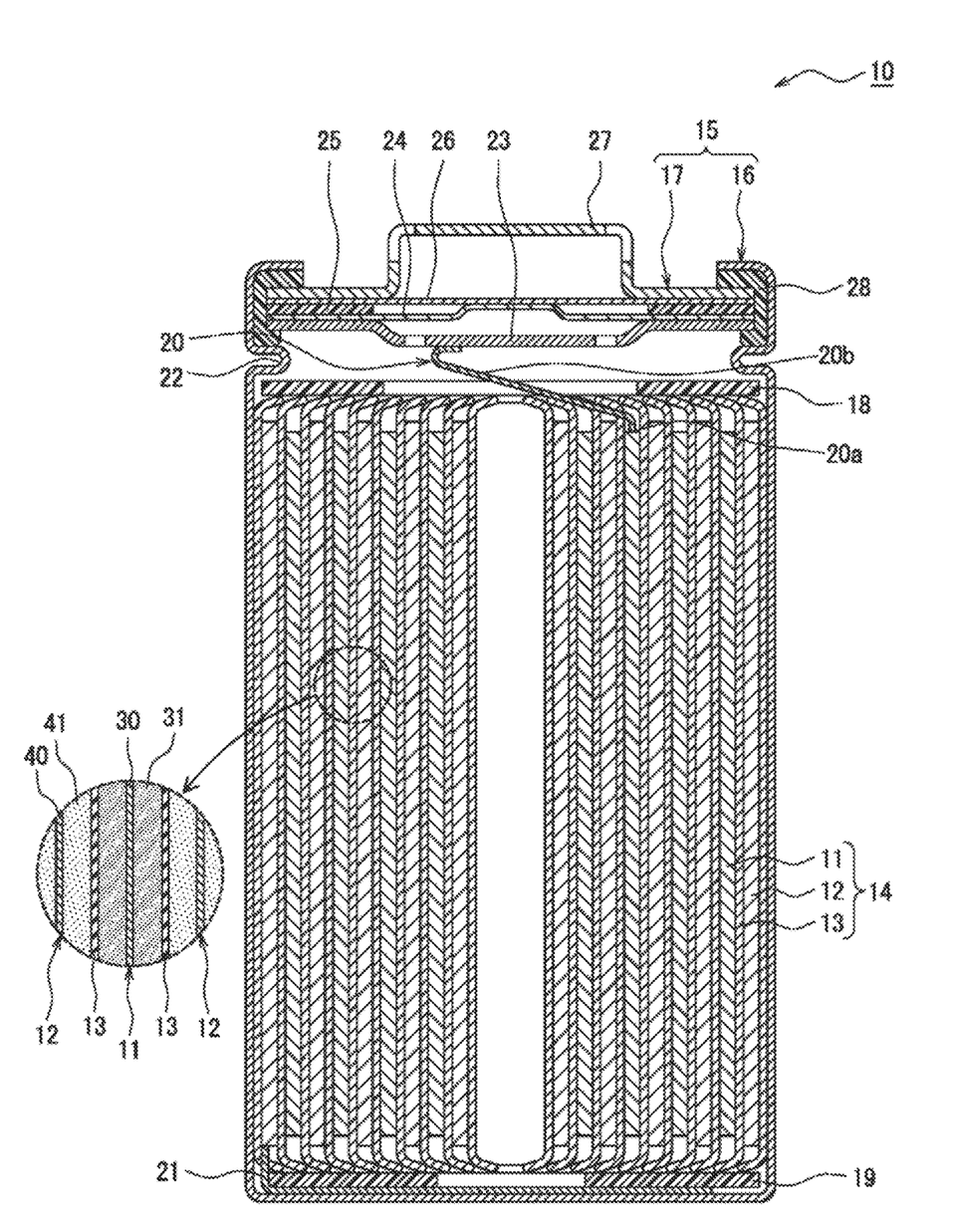
Figure is a cross sectional plan view of the non-aqueous electrolyte secondary battery according to an example of an embodiment.

The Figure is a cross sectional plan view of a non-aqueous electrolyte secondary battery 10 that is an example of the embodiment. As illustrated in the Figure, non-aqueous electrolyte secondary battery 10 comprises an electrode assembly 14, a non-aqueous electrolyte (not shown), and a battery case 15 that houses electrode assembly 14 and the non-aqueous electrolyte. Electrode assembly 14 has a wound structure in which a positive electrode 11 and a negative electrode 12 are wound via a separator 13. Battery case 15 is composed of a bottomed cylindrical outer can 16 and a sealing assembly 17 that clogs up the opening of an outer can 16.

Electrode assembly 14 is composed of long positive electrode 11, long negative electrode 12, two long separators 13, a positive electrode tab 20 joined to positive electrode 11, and a negative electrode tab 21 joined to negative electrode 12. Negative electrode 12 is formed to have a size one size larger than that of positive electrode 11 in order to prevent lithium from precipitation. Namely, negative electrode 12 is formed longer than positive electrode 11 in the longitudinal direction and the width direction (short direction). Two separators 13 are formed to have sizes at least one size larger than a size of positive electrode 11, and are arranged to sandwich positive electrode 11, for example.

Non-aqueous electrolyte secondary battery 10 comprises insulating plates 18 and 19 arranged above and below electrode assembly 14, respectively. In the example shown in the Figure, positive electrode tab 20 attached to positive electrode 11 extends to the sealing assembly 17 side through the throughhole of insulating plate 18, and negative electrode tab 21 attached to negative electrode 12 passes through the outside of insulating plate 19 and extends to the bottom side of outer can 16. Positive electrode tab 20 is connected to the lower surface of a bottom plate 23 of sealing assembly 17 by welding or the like, and a cap 27 of sealing assembly 17 electrically connected to bottom plate 23 serves as a positive electrode terminal. Negative electrode tab 21 is connected to the inner surface of the bottom of outer can 16 by welding or the like, and outer can 16 serves as a negative electrode terminal.

Outer can 16 is, for example, a bottomed cylindrical metal container. A gasket 28 is arranged between outer can 16 and sealing assembly 17, and seals the internal space of battery case 15. Outer can 16 has a grooved portion 22 that supports sealing assembly 17, which is formed by pressing, for example, the side surface portion from the outside. Grooved portion 22 is preferably formed in an annular shape along the circumferential direction of outer can 16, and supports sealing assembly 17 on the upper surface of the grooved portion.

Sealing assembly 17 has a structure in which bottom plate 23, a lower vent member 24, an insulating member 25, an upper vent member 26, and cap 27 are stacked in this order from the electrode assembly 14 side. Each member constituting sealing assembly 17 has, for example, a disk shape or a ring shape, and each member except insulating member 25 is electrically connected to each other. Lower vent member 24 and upper vent member 26 are connected to each other at the central portion thereof, and insulating member 25 is interposed between the peripheral portions of each member. When the internal pressure of the battery rises due to abnormal heat generation, lower vent member 24 is deformed and broken so as to push upper vent member 26 toward the cap 27 side, and the current path between lower vent member 24 and upper vent member 26 is cut off. When the internal pressure further rises, upper vent member 26 is broken and a gas is discharged from the opening of cap 27.

Hereinafter, positive electrode 11, negative electrode 12, separator 13, and the non-aqueous electrolyte, constituting non-aqueous electrolyte secondary battery 10, will be described in detail, and in particular, the positive electrode active material included in a positive electrode active material layer 31 forming positive electrode 11 will be described in detail.

Positive Electrode

Positive electrode 11 has a positive electrode current collector 30 and a positive electrode active material layer 31 formed on both sides of positive electrode current collector 30. As positive electrode current collector 30, a foil of a metal such as aluminum or an aluminum alloy that is stable in the potential range of positive electrode 11, or a film or the like in which the metal is arranged on the surface layer, can be used. Positive electrode active material layer 31 includes a positive electrode active material, a conductive agent, and a binder. The thickness of positive electrode active material layer 31 is, for example, 10 μm to 150 μm on one side of positive electrode current collector 30. Positive electrode 11 is fabricated by coating a surface of positive electrode current collector 30 with a positive electrode slurry including the positive electrode active material, the conductive agent, the binder, etc., drying the coating film, and then compressing it to form positive electrode active material layers 31 on both sides of the positive electrode current collector 30.

The conductive agent included in positive electrode active material layer 31 that is carbon materials such as carbon black, acetylene black, Ketjen black, and graphite, can be exemplified. As the binder included in positive electrode active material layer 31, fluororesins such as polytetrafluoroethylene (PTFE) and polyvinylidene difluoride (PVdF), polyacrylonitrile (PAN), polyimides, acrylic resins, and polyolefins can be exemplified. These resins may be combined with carboxymethyl cellulose (CMC) or a salt thereof, polyethylene oxide (PEO), or the like.

The positive electrode active material includes the lithium transition metal composite oxide and the surface modification layer formed on a surface of primary particles of the lithium transition metal composite oxide. The lithium transition metal composite oxide includes at least 80 mol % or more of Ni to the total number of mole of metal elements excluding Li, and Al. When the proportion of Ni to the total number of mole of metal elements excluding Li in the lithium transition metal composite oxide is 80 mol % or more, a battery of high capacity can be obtained.

The lithium transition metal composite oxide has a layered structure. The layered structure of the lithium transition metal composite oxide includes, for example, a layered structure belonging to a space group R-3m, and a layered structure belonging to a space group C2/m. Among them, the layered structure belonging to the space group R-3m is preferred in terms of increasing capacity, stability of crystal structure, etc.

A proportion of Ni to the total number of mole of metal elements excluding Li in the lithium transition metal composite oxide is preferably 90 mol % or more, from which a battery of higher capacity can be obtained.

The lithium transition metal composite oxide can be a composite oxide represented by the formula: $Li_aNi_xAl_yCo_zM_wO_{2-b}$ wherein in the formula, $0.95<a<1.05$, $0.8 \le x \le 0.96$, $0<y \le 0.10$, $0 \le z \le 0.15$, $0 \le w \le 0.1$, $0 \le b \le 0.05$, $x+y+z+w=1$, and M is at least one element selected from Mn, Fe, Ti, Si, Nb, Zr, Mo and Zn. The positive electrode active material may include a lithium transition metal composite oxide other than that represented by the above formula, or another compound, as long as the object of the present disclosure is not impaired. Molar fractions of the metal elements included in the entire particle of the lithium transition metal composite oxide are measured by inductively coupled plasma (ICP) emission spectroscopy.

The subscript a denoting a proportion of Li in the lithium transition metal composite oxide preferably satisfies $0.95 \le a < 1.05$ and more preferably $0.97 \le a \le 1.03$. When a is less than 0.95, the battery capacity may be decreased as compared with the case where a satisfies the above range. When a is 1.05 or more, a larger amount of Li compound is to be added as compared with the case where a satisfies the above range, which may not be economical from the viewpoint of production cost.

The subscript y denoting a proportion of Al to the total number of mole of metal elements excluding Li in the lithium transition metal composite oxide, preferably satisfies $0<y \le 0.10$ and more preferably $0.03 \le y \le 0.07$. Al that does not change in oxidation number even during charge/discharge and is included in the transition metal layer, is presumed to stabilize the structure of the transition metal layer. When $y>0.10$, on the other hand, Al impurities are generated, lowering the battery capacity. For example, Al may be uniformly dispersed in the layered structure of the lithium transition metal composite oxide, or may be present in a portion of the layered structure.

Co and M (M is at least one element selected from Mn, Fe, Ti, Si, Nb, Zr, Mo and Zn) are optional components. The subscript z and w denoting the proportions of Co and M to the total number of mole of metal elements excluding Li in the lithium transition metal composite oxide preferably satisfy $0 \le z \le 0.15$ and $0 \le w \le 0.1$, respectively. Co is expensive and therefore a Co content is preferably minimized from the viewpoint of production cost.

The lithium transition metal composite oxide is, for example, a secondary particle formed by aggregating a plurality of primary particles. The particle size of the primary particle constituting the secondary particle is, for example, 0.05 μm to 1 μm. The particle size of the primary particle is measured as a diameter of a circumscribed circle in the particle image observed by a scanning electron microscope (SEM). The surface modification layer is present on the surface of the primary particles. In other words, the surface modification layer is present on the surface of the secondary particles of the lithium transition metal composite oxide or at the interface where the primary particles contact with each other.

The lithium transition metal composite oxide is a particle having a volume-based median diameter (D50) of, for example, 3 μm to 30 μm, preferably 5 μm to 25 μm, and particularly preferably 7 μm to 15 μm. D50 refers to a particle size in which a cumulative frequency is 50% from the smallest particle size in a volume-based particle size distribution, and is also called a median diameter. The particle size distribution of the lithium transition metal composite oxide can be measured by using a laser diffraction type particle size distribution measuring apparatus (for example, MT3000II manufactured by MicrotracBEL Corp.) and water as a dispersion medium.

The lithium transition metal composite oxide has a surface layer present on an inner side from the surface and a main body portion present on an inner side of the surface layer. The thickness of the surface layer is, for example, 1 nm to 5 nm.

A proportion of Al to the total number of mole of metal elements other than Li in the surface layer is 1.3 times or more a proportion of Al to the total number of mole of metal elements other than Li in the main body portion. This stabilizes the structure of the surface layer more than that of the main body portion, enabling to inhibit lowering in battery capacity accompanying charge/discharge by the synergistic effect with the surface modification layer described later. The proportion of Al to the total number of mole of metal elements other than Li in the surface layer can be, for example, four times or less the proportion of Al to the total number of mole of metal elements other than Li in the main body portion.

The surface modification layer includes at least Sr. The surface modification layer may include, for example, Sr or a compound including Sr. As the compound including Sr, $SrO_2$ can be exemplified. The surface modification layer may further include at least one selected from the group consisting of Al or a compound including Al as well as a compound including Sr and Al. As the compound including Al, $Al_2O_3$ can be exemplified. Moreover, $SrAlO_4$ can be exemplified as the compound including Sr and Al. The surface modification layer may further include Li. Li present on the surface of the lithium transition metal composite oxide described later may be included in the surface modification layer.

A proportion of Al to the total number of mole of metal elements other than Li in the surface modification layer can be larger than a proportion of Al to the total number of mole of metal elements other than Li in the main body portion of the lithium transition metal composite oxide.

Moreover, the proportion of Al to the total number of mole of metal elements other than Li in the surface modification layer is preferably 1.9 times or more the proportion of Al to the total number of mole of metal elements other than Li in the main body portion of the lithium transition metal composite oxide.

A proportion of Sr in the surface modification layer can be 0.05 mol % to 0.25 mol % to the total number of mole of metal elements other than Li in the surface modification layer. The proportion within this range can render change in the surface state of the lithium transition metal composite oxide due to electronic interaction.

A thickness of the surface modification layer is, for example, 0.1 nm to 2 nm. The thickness within this range inhibits a reaction with an electrolytic solution on a surface of the lithium transition metal composite oxide, which enables to inhibit reduction in battery capacity accompanying charge/discharge by the synergistic effect with the aforementioned surface layer.

An amount of Li remaining on a surface of the lithium transition metal composite oxide (hereinafter, may be referred to as an amount of residual Li) can be 0.03 wt % to 0.08 wt %. The Li present on the surface of the lithium transition metal composite oxide includes Li included in the surface modification layer, and Li, for example, in a form of being present as a Li compound on the surface modification layer but present without being included in the surface modification layer.

The amount of residual Li can be quantified by dispersing the positive electrode active material in water to obtain elution thereof and using a titration method. The specific measurement method is as follows.

(1) 1 g of the positive electrode active material is added to 30 ml of pure water and stirred to prepare a suspension in which the active material is dispersed in water.

(2) The suspension is filtered, and diluted by addition of pure water to 70 ml in a measuring flask, and thus a filtrate including Li eluted from the active material is obtained.

(3) While measuring the pH of the filtrate, hydrochloric acid is added dropwise to the filtrate little by little, and from an amount of hydrochloric acid (the titration amount) consumed up to the first inflection point (around pH 8) and the second inflection point (around pH 4) of the pH curve, an amount of Li dissolved in the filtrate is calculated.

A content of the lithium transition metal composite oxide in the positive electrode active material is preferably 90% by mass or more, and more preferably 99% by mass or more relative to the total mass of the positive electrode active material in terms of, for example, improving the capacity of the battery and effectively inhibiting deterioration of charge/discharge cycle characteristics.

Further, the positive electrode active material of the present embodiment may include other lithium transition metal composite oxide in addition to the lithium transition metal composite oxide of the present embodiment. Other lithium transition metal composite oxide includes, for example, a lithium transition metal composite oxide having a Ni content of 0 mol % or more and less than 85 mol %.

Next, an example of a method for producing the positive electrode active material including the lithium transition metal composite oxide and the surface modification layer will be described.

The method for producing a positive electrode active material comprises, for example, a first step of obtaining a composite oxide including Ni, Al and an arbitrary metal element, a second step of mixing the composite oxide obtained in the first step and a lithium compound to obtain a mixture, and a third step of calcinating the mixture. Each parameter of the compositions and thicknesses of the surface layer and the surface modification layer in the finally obtained positive electrode active material is adjusted by controlling, for example, the mixing proportion of the raw materials in the second step, and the calcination temperature and time in the third step.

In the first step, for example, while stirring a solution of metal salts including Ni, Al and an arbitrary metal element (Co, Mn, Fe or the like), an alkaline solution such as sodium hydroxide is added dropwise, and the pH is adjusted to the alkaline side (for example, 8.5 to 12.5) to precipitate (co-precipitate) a composite hydroxide including Ni, Al and the arbitrary metal element, and then the composite hydroxide is calcinated to obtain a composite oxide including Ni, Al and the arbitrary metal element. The calcination temperature is not particularly limited, but is, for example, in the range of 300° C. to 600° C.

In the second step, the composite oxide obtained in the first step is mixed with a lithium compound and a strontium compound to obtain a mixture. The lithium compound includes, for example, $Li_2CO_3$, LiOH, $Li_2O_2$, $Li_2O$, $LiNO_3$, $LiNO_2$, $Li_2SO_4$, $LiOH \cdot H_2O$, LiH and LiF. The strontium compound includes $Sr(OH)_2$, $Sr(OH)_2 \cdot 8H_2O$, SrO, $SrCO_3$, $SrSO_4$ and $Sr(NO_3)_2$. The mixing proportion of the composite oxide obtained in the first step and the lithium compound is, preferably, for example, such that the molar ratio of the metal elements excluding Li and Li is in the range of 1:0.98 to 1:1.1, in terms of facilitating the aforementioned each parameter to be adjusted to the aforementioned specified ranges. Further, a mixing proportion of the composite oxide obtained in the first step and the strontium compound is preferably, for example, such that the molar ratio of the metal elements excluding Li to Sr is in the range of 1:0.0005 to 1:0.0018, in terms of facilitating the aforementioned each parameter to be adjusted to the aforementioned specified range. In the second step, when mixing the composite oxide obtained in the first step, the lithium compound, and the strontium compound, some other metal raw material may be added if necessary. The other metal raw material is an oxide or the like including a metal element other than the metal elements constituting the composite oxide obtained in the first step.

In the third step, the mixture obtained in the second step is calcinated at a predetermined temperature and time to obtain a positive electrode active material according to the present embodiment. The calcination of the mixture in the third step comprise a multi-step calcination step including, for example, a first calcination step of calcinating in a calcination furnace at a first rate of temperature rise up to a first set temperature of 450° C. or higher and 680° C. or lower under an oxygen stream, and a second calcination step of calcinating the calcinated product obtained in the above first calcination step in a calcination furnace at a second rate of temperature rise up to a second set temperature of higher than 680° C. and 800° C. or lower under an oxygen stream. Here, the first rate of temperature rise is in the range of 1.5° C./min or more and 5.5° C./min or less, and the second rate of temperature rise that is slower than the first rate of temperature rise is 0.1° C./min or more and 3.5° C./min or less. For the positive electrode active material of the present embodiment finally obtained, such multi-step calcination can adjust each parameter of the compositions and thicknesses of the surface layer and the surface modification layer, and the like, within the specified range described above. A plurality of the first rates of temperature rise and the second rates of temperature rise may be set for each temperature region provided that they are within the aforementioned specified ranges, respectively. The holding time of the first set temperature in the first calcination step is preferably 0 hours or longer and 5 hours or shorter, and more preferably 0 hours or longer and 3 hours or shorter in terms of adjusting each of the above parameters of the lithium transition metal composite oxide to the aforementioned specified ranges. The holding time of the first set temperature is the time for maintaining the first set temperature after reaching the first set temperature. The holding time of the second set temperature in the second calcination step is preferably 1 hour or longer and 10 hours or shorter and more preferably 1 hour or longer and 5 hours or shorter, in terms of adjusting each of the above parameters of the lithium transition metal composite oxide to the aforementioned specified ranges. The holding time of the second set temperature is the time for maintaining the second set temperature after reaching the second set temperature. When calcinating the mixture, in order to adjust each of the above parameters to the aforementioned specified ranges, for example, calcination can be carried out in an oxygen stream having an oxygen concentration of 60% or more and a flow rate of the oxygen stream being set to in the range of 0.2 mL/min to 4 mL/min per 10 cm³ of the calcination furnace and 0.3 L/min or more per kg of the mixture.

Molar fractions of the metal elements included in the positive electrode active material obtained above were measured by inductively coupled plasma (ICP) emission spectroscopic analysis and the positive electrode active material can be represented by the formula: $Li_a Ni_x Al_y Co_z M_w Sr_\alpha O_{2-b}$ wherein in the formula, $0.95<a<1.05$, $0.8 \leq x \leq 0.96$, $0<y \leq 0.10$, $0 \leq z \leq 0.15$, $0 \leq w \leq 0.1$, $0.05 \leq \alpha \leq 0.18$, $0 \leq b<0.05$, $x+y+z+w=1$, and M is at least one element selected from Mn, Fe, Ti, Si, Nb, Zr, Mo and Zn. It should be noted that Sr is not dissolved in the lithium transition metal composite oxide, but is included in the surface modification layer present on the surface of the lithium transition metal composite oxide. Moreover, a portion of Al may be included in the surface modification layer.

Moreover, compositions of the internal and surface layers of the lithium transition metal composite oxide in the positive electrode active material as well as the composition of the surface modification layer can be obtained by using energy dispersive X-ray spectroscopy (TEM-EDX), and analysis on each location in the cross section of the primary particle of the positive electrode active material, can measure a proportion of Ni, Co, Al, and M. It is noted that since the surface modification layer is thinner than a spot diameter of an irradiated electron beam, the composition of the surface modification layer is influenced by the composition of the adjacent surface layer, and therefore, even though Ni, Co, and Mn are found from the measurement results of the surface layer, Ni, Co, and M are presumed not to be actually present in the surface layer. Further, since the amount of Sr added is small as presented as a described above, the presence or absence of Sr can be confirmed, but it cannot be quantitatively measured.

Negative Electrode

Negative electrode 12 has a negative electrode current collector 40 and negative electrode active material layers 41 formed on both sides of negative electrode current collector 40. As negative electrode current collector 40, a foil of a metal such as copper or a copper alloy that is stable in the potential range of negative electrode 12, or a film or the like in which the metal is arranged on the surface layer, can be used. Negative electrode active material layer 41 includes a negative electrode active material and a binder. The thickness of negative electrode active material layer 41 is, for example, 10 μm to 150 μm on one side of negative electrode current collector 40. Negative electrode 12 can be fabricated by coating the surface of negative electrode current collector 40 with a negative electrode slurry including the negative electrode active material, the binder, etc., drying the coating film, and then rolling it to form negative electrode active material layers 41 on both sides of negative electrode current collector 40.

The negative electrode active material included in negative electrode active material layer 41 is not particularly limited provided that it can reversibly intercalate and deintercalate lithium ions, and a carbon material such as graphite is generally used. The graphite may be any of natural graphite such as scaly graphite, massive graphite and earthy graphite, and artificial graphite such as massive artificial graphite and graphitized mesophase carbon microbeads. Moreover, as the negative electrode active material, a metal such as Si or Sn that alloys with Li, a metal compound including Si, Sn or the like, a lithium titanium composite oxide, or the like may be used. Further, such a material coated with a carbon film may be used. For example, a Si-containing compound represented by $SiO_x$ ($0.5 \leq x \leq 1.6$), a Si-containing compound in which Si fine particles are dispersed in a lithium silicate phase represented by $Li_{2y}SiO_{(2+y)}$ ($0<y<2$), or the like can be combined with graphite.

As the binder included in negative electrode active material layer 41, a fluororesin such as PTFE or PVdF, a PAN, a polyimide, an acrylic resin, a polyolefin or the like may be used as in the case of positive electrode 11, however, styrene-butadiene rubber (SBR) is preferably used. Moreover, negative electrode active material layer 41 may include CMC or a salt thereof, polyacrylic acid (PAA) or a salt thereof, polyvinyl alcohol (PVA), etc.

Separator

Separator 13 that is, for example, a porous sheet having ion permeability and insulating property, is used. Specific examples of the porous sheet include a microporous thin membrane, a woven fabric, and a non-woven fabric. As a material of the separator, a polyolefin such as polyethylene or polypropylene, cellulose, or the like is suitable. Separator 13 may have a single-layer structure or a multilayer structure. Further, a resin layer having high heat resistance, such as an aramid resin, and a filler layer including a filler of an inorganic compound, may be disposed on a surface of separator 13.

Non-Aqueous Electrolyte

The non-aqueous electrolyte includes, for example, a non-aqueous solvent and an electrolyte salt dissolved in the non-aqueous solvent. As the non-aqueous solvent, for example, an ester, an ether, a nitrile such as acetonitrile, an amide such as dimethylformamide, or a mixed solvent of two or more of them can be used. The non-aqueous solvent may include a halogen substituent in which at least a portion of hydrogen in the solvent is substituted with a halogen atom such as fluorine. The halogen substituent includes, for example, a fluorinated cyclic carbonate such as fluoroethylene carbonate (FEC), a fluorinated chain carbonate, and a fluorinated chain carboxylic acid ester such as fluorine methyl propionate (FMP).

Examples of the aforementioned esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methylpropyl carbonate, ethylpropyl carbonate, and methylisopropylcarbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP) and ethyl propionate (EP).

Examples of the aforementioned ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The electrolyte salt is preferably a lithium salt. Examples of lithium salts include borates such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, lithium chloroborane, lithium lower aliphatic carboxylate, $Li_2B_4O_7$, $Li(B)(C_2O_4)F_2$), and imide salts such as $LiN(SO_2CF_3)_2$ and $LiN(CiF_{2l+1}SO_2)(C_mF_{2m+1}SO_2)$ wherein l and in are integers of 0 or more. The lithium salt may be used alone, or a plurality of types may be mixed and used. Among them, $LiPF_6$ is preferably used from the viewpoint of ionic conductivity, electrochemical stability, etc. The concentration of the lithium salt is, for example, 0.8 mol to 1.8 mol per 1 L of the non-aqueous solvent. Moreover, a vinylene carbonate or a propane sultone-based additive may be further added.

EXAMPLES

The present disclosure will be further described below with reference to Examples and Comparative Examples, but the present disclosure is not limited to the following Examples.

Production of Positive Electrode Active Material

Example 1

A composite hydroxide represented by $[Ni_{0.82}Al_{0.05}Co_{0.13}](OH)_2$ obtained by the co-precipitation method was calcinated at 500° C. for 8 hours to obtain a composite oxide $(Ni_{0.82}Al_{0.05}Co_{0.13}O_2)$. LiOH, $Sr(OH)_2$, and the above composite oxide were mixed so that the molar ratio of Li, the total amount of Ni, Al and Co, and Sr was 1.03:1:0.0005, to obtain a mixture. After the mixture was calcinated from room temperature to 650° C. under an oxygen stream with an oxygen concentration of 95% (flow rate of 2 mL/min per 10 cm³ and 5 L/min per kg of the mixture) at a rate of temperature rise of 2.0° C./min, it was calcinated by raising the temperature from 650° C. to 780° C. at a rate of temperature rise of 0.5° C./min. Impurities were removed from this calcinated product by washing with water to obtain a positive electrode active material. As a result of measuring the composition of the obtained positive electrode active material by using an ICP emission spectroscopic analyzer (trade name "iCAP6300", manufactured by Thermo Fisher Scientific Inc.), the composition was found to be $LiNi_{0.82}Al_{0.05}Co_{0.13}Sr_{0.0005}O_2$. This was used as the positive electrode active material of Example 1.

Comparative Example 1

A positive electrode active material was obtained in the same manner as in Example 1 except that LiOH and the composite oxide $(Ni_{0.82}Al_{0.05}Co_{0.13}O_2)$ were mixed so that the molar ratio of Li and the total amount of Ni, Al, and Co was 1.03:1, to obtain a mixture. The composition of the obtained positive electrode active material was $LiNi_{0.87}Al_{0.04}Co_{0.09}O_2$. This was used as the positive electrode active material of Comparative Example 1.

Example 2

A positive electrode active material was obtained in the same manner as in Example 1 except that the composite hydroxide represented by $[Ni_{0.87}Al_{0.04}Co_{0.09}](OH)_2$ was used to obtain the composite oxide $(Ni_{0.87}Al_{0.04}Co_{0.09}O_2)$, and a mixture was obtained by mixing LiOH, $Sr(OH)_2$, and the above composite oxide so that the molar ratio of Li, the total amount of Ni, Al, and Co, and Sr was 1.03:1:0.001. The composition of the obtained positive electrode active material was $LiNi_{0.87}Al_{0.04}Co_{0.09}Sr_{0.001}O_2$. This was used as the positive electrode active material of Example 2.

Comparative Example 2

A positive electrode active material was obtained in the same manner as in Example 2 except that LiOH and the composite oxide $(Ni_{0.87}Al_{0.04}Co_{0.09}O_2)$ were mixed so that the molar ratio of Li and the total amount of Ni, Al, and Co was 1.03:1, to obtain a mixture. The composition of the obtained positive electrode active material was $LiNi_{0.87}Al_{0.04}Co_{0.09}O_2$. This was used as the positive electrode active material of Comparative Example 2.

Example 3

A positive electrode active material was obtained in the same manner as in Example 1 except that the composite hydroxide represented by $[Ni_{0.92}Al_{0.05}Co_{0.01}Mn_{0.02}](OH)_2$ was used to obtain the composite oxide $(Ni_{0.92}Al_{0.05}Co_{0.01}Mn_{0.02}O_2)$, and a mixture was obtained by mixing LiOH, $Sr(OH)_2$ and the above composite oxide so that the molar ratio of Li, the total amount of Ni, Al, Co, and Mn, and Sr was 1.03:1:0.0007. The composition of the obtained positive electrode active material was $LiNi_{0.92}Al_{0.05}Co_{0.01}Mn_{0.02}Sr_{0.007}O_2$. This was used as the positive electrode active material of Example 3.

Comparative Example 3

A positive electrode active material was obtained in the same manner as in Example 3 except that LiOH and the composite oxide $(Ni_{0.92}Al_{0.05}Co_{0.01}Mn_{0.02}O_2)$ were mixed so that the molar ratio of Li and the total amount of Ni, Al, Co, and Mn was 1.03:1, to obtain a mixture. The composition of the obtained positive electrode active material was $LiNi_{0.92}Al_{0.05}Co_{0.01}Mn_{0.02}O_2$. This was used as the positive electrode active material of Comparative Example 3.

Example 4

A positive electrode active material was obtained in the same manner as in Example 1 except that the composite hydroxide represented by $[Ni_{0.91}Al_{0.05}Mn_{0.04}](OH)_2$ was used to obtain the composite oxide $(Ni_{0.91}Al_{0.05}Mn_{0.04}O_2)$, and the mixture was obtained by mixing LiOH, $Sr(OH)_2$, and the above composite oxide so that the molar ratio of Li, the total amount of Ni, Al, and Mn, and Sr was 1.03:1:0.0015. The composition of the obtained positive electrode active material was $LiNi_{0.91}Al_{0.05}Mn_{0.04}Sr_{0.0015}O_2$. This was used as the positive electrode active material of Example 4.

Comparative Example 4

A positive electrode active material was obtained in the same manner as in Example 4 except that LiOH and the composite oxide $(Ni_{0.91}Al_{0.05}Mn_{0.04}O_2)$ were mixed so that the molar ratio of Li and the total amount of Ni, Al, and Mn was 1.03:1, to obtain a mixture. The composition of the obtained positive electrode active material was $LiNi_{0.91}Al_{0.05}Mn_{0.04}O_2$. This was used as the positive electrode active material of Comparative Example 4.

Example 5

A positive electrode active material was obtained in the same manner as in Example 1 except that the composite hydroxide represented by $[Ni_{0.92}Al_{0.06}Mn_{0.02}](OH)_2$ was used to obtain the composite oxide $(Ni_{0.92}Al_{0.06}Mn_{0.02}O_2)$, and the mixture was obtained by mixing LiOH, $Sr(OH)_2$, and the above composite oxide so that the molar ratio of Li, the total amount of Ni, Al, and Mn, and Sr was 1.03:1:0.0018. The composition of the obtained positive electrode active material was $LiNi_{0.92}Al_{0.06}Mn_{0.02}Sr_{0.0018}O_2$. This was used as the positive electrode active material of Example 5.

Comparative Example 5

A positive electrode active material was obtained in the same manner as in Example 5 except that LiOH and the composite oxide $(Ni_{0.92}Al_{0.06}Mn_{0.02}O_2)$ were mixed so that the molar ratio of Li and the total amount of Ni, Al, and Mn was 1.03:1, to obtain a mixture. The composition of the obtained positive electrode active material was $LiNi_{0.92}Al_{0.06}Mn_{0.02}O_2$. This was used as the positive electrode active material of Comparative Example 5.

Comparative Example 6

A positive electrode active material was obtained in the same manner as in Example 1 except that the composite hydroxide represented by $[Ni_{0.60}Co_{0.21}Mn_{0.19}](OH)_2$ was used to obtain the composite oxide $(Ni_{0.60}Co_{0.21}Mn_{0.19}O_2)$, and the mixture was obtained by mixing LiOH and $Sr(OH)_2$ and the above composite oxide so that the molar ratio of Li, the total amount of Ni, Co, and Mn, and Sr was 1.03:1:0.001. The composition of the obtained positive electrode active material was $LiNi_{0.60}Co_{0.21}Mn_{0.19}Sr_{0.001}O_2$. This was used as the positive electrode active material of Comparative Example 6.

Comparative Example 7

A positive electrode active material was obtained in the same manner as in Comparative Example 6 except that LiOH and the composite oxide $(Ni_{0.60}Co_{0.21}Mn_{0.19}O_2)$ were mixed so that the molar ratio of Li and the total amount of Ni, Co. and Mn was 1.03:1, to obtain a mixture. The composition of the obtained positive electrode active material was $LiNi_{0.60}Co_{0.21}Mn_{0.19}O_2$. This was used as the positive electrode active material of Comparative Example 7.

TEM-EDX measurement was carried out for each of the positive electrode active materials of Examples 1 to 5 and Comparative Examples 1 to 7, and composition analysis was carried out for each of the internal and surface layers of the lithium transition metal composite oxide as well as the surface modification layer. Sr could not be quantified and therefore the presence or absence of Sr was confirmed by the presence or absence of the peak. Moreover, the residual Li amounts of the positive electrode active materials of Examples 1 to 5 and Comparative Examples 1 to 7 were measured. The results are shown in Table 1.

TABLE 1

| | Sr amount added (mole %) | Analysis region | Composition of lithium transition metal composite oxide | | | | | Residual Li amount (wt %) |
| --- | --- | --- | --- | --- | --- | --- | --- | --- |
| | | | Ni (mole %) | Al (mole %) | Co (mole %) | Mn (mole %) | Sr (mole %) | |
| Example 1 | 0.05 | Surface modification layer | 78.9 | 10 | 11.1 | 0 | Present | 0.049 |
| | | Surface layer | 81.2 | 6.6 | 12.2 | 0 | Absent | |
| | | Main body portion | 82.1 | 5 | 12.9 | 0 | Absent | |
| Comparative Example 1 | — | Surface modification layer | 82.2 | 5 | 12.8 | 0 | — | 0.05 |
| | | Surface layer | 82.1 | 4.9 | 13 | 0 | | |
| | | Main body portion | 82.1 | 5 | 12.9 | 0 | | |
| Example 2 | 0.1 | Surface modification layer | 78.3 | 13.5 | 8.2 | 0 | Present | 0.06 |
| | | Surface layer | 80.7 | 9.4 | 9.9 | 0 | Absent | |
| | | Main body portion | 86.4 | 3 | 10.6 | 0 | Absent | |
| Comparative Example 2 | — | Surface modification layer | 86.8 | 3.7 | 9.5 | 0 | — | 0.059 |
| | | Surface layer | 86.8 | 3.7 | 9.5 | 0 | | |
| | | Main body portion | 86.9 | 3.7 | 9.4 | 0 | | |
| Example 3 | 0.07 | Surface modification layer | 87.3 | 10.5 | 0.9 | 1.3 | Present | 0.058 |
| | | Surface layer | 90.4 | 7 | 1 | 1.6 | Absent | |
| | | Main body portion | 91.8 | 5.3 | 1.1 | 1.8 | Absent | |
| Comparative Example 3 | — | Surface modification layer | 91.8 | 5.2 | 1 | 2 | — | 0.058 |
| | | Surface layer | 91.8 | 5.3 | 1.2 | 1.7 | | |
| | | Main body portion | 91.9 | 5.3 | 1.1 | 1.7 | | |
| Example 4 | 0.15 | Surface modification layer | 83.8 | 13.2 | 0 | 3 | Present | 0.068 |
| | | Surface layer | 89.2 | 7.4 | 0 | 3.4 | Absent | |
| | | Main body portion | 91.2 | 5 | 0 | 3.8 | Absent | |
| Comparative Example 4 | — | Surface modification layer | 91 | 4.9 | 0 | 4.1 | — | 0.063 |
| | | Surface layer | 91.2 | 5.1 | 0 | 3.7 | | |
| | | Main body portion | 91.1 | 5 | 0 | 3.9 | | |
| Example 5 | 0.18 | Surface modification layer | 82.5 | 14.8 | 0 | 2.7 | Present | 0.063 |
| | | Surface layer | 89 | 7.8 | 0 | 3.2 | Absent | |
| | | Main body portion | 92.1 | 5.8 | 0 | 2.1 | Absent | |

TABLE 1-continued

| | Sr amount added (mole %) | Analysis region | Composition of lithium transition metal composite oxide | | | | | Residual Li amount (wt %) |
|---|---|---|---|---|---|---|---|---|
| | | | Ni (mole %) | Al (mole %) | Co (mole %) | Mn (mole %) | Sr (mole %) | |
| Comparative Example 5 | — | Surface modification layer | 92 | 5.7 | 0 | 2.3 | — | 0.074 |
| | | Surface layer | 92.2 | 5.6 | 0 | 2.2 | | |
| | | Main body portion | 92.1 | 5.8 | 0 | 2.1 | | |
| Comparative Example 6 | 0.1 | Surface modification layer | 59.5 | 0 | 21 | 19.5 | Present | 0.049 |
| | | Surface layer | 59.6 | 0 | 21 | 19.4 | Absent | |
| | | Main body portion | 59.6 | 0 | 21.1 | 19.3 | Absent | |
| Comparative Example 7 | — | Surface modification layer | 59.5 | 0 | 21 | 19.5 | — | 0.053 |
| | | Surface layer | 59.6 | 0 | 21 | 19.4 | | |
| | | Main body portion | 59.6 | 0 | 21.1 | 19.3 | | |

In each of Examples 1 to 5, the Al content of the surface modification layer was higher than the Al content of the main body portion and the Al content of the surface layer. In each of Comparative Examples 1 to 5, on the other hand, such a tendency was not observed. In each of Examples 1 to 5, the Al content in the surface modification layer is higher than the Al content in the surface layer, and Al is present in the surface modification layer, however, in each of Comparative Examples 1 to 5, the Al contents of the surface modification layer and the surface layer are about the same, from which Al is presumed not to be present in the surface modification layer because the content thereof is influenced by the composition of the adjacent surface layer. Moreover, in each of Examples 1 to 5 and Comparative Example 6, in which Sr was added, Sr was detected only in the surface modification layer, but not in the surface layer and the main body portion. In any sample, the composition of the surface modification layer is influenced by the composition of the adjacent surface layer, and Ni, Co, and Mn are presumed not to be present in the surface modification layer. In addition, residual Li was detected in all the samples.

Next, by using the positive electrode active materials of Examples 1 to 5 and Comparative Examples 1 to 7, test cells were fabricated as follows.

Fabrication of Positive Electrode 91 parts by mass of the positive electrode active material of each of Examples 1 to 5 and Comparative Examples 1 to 7, 7 parts by mass of acetylene black as a conductive agent, and 2 parts by mass of polyvinylidene fluoride as a binder were mixed to prepare a positive electrode slurry by mixing with N-methyl-2-pyrolidone (NMP). Next, a positive electrode current collector made of aluminum foil having a thickness of 15 pun was coated with the slurry and the coating film was dried, then rolled by a rolling roller, and cut into a predetermined electrode size to obtain a positive electrode in which positive electrode mixture layers were formed on both sides of the positive electrode core body. It is noted that an exposed portion of the positive electrode core body with the surface exposed was arranged on a portion of the positive electrode. Positive electrodes of other Examples and Comparative Examples were fabricated in the same manner.

Fabrication of Negative Electrode

Natural graphite was used as a negative electrode active material. A negative electrode active material, sodium carboxymethyl cellulose (CMC-Na), and styrene-butadiene rubber (SBR) were mixed in an aqueous solution at a solid content mass ratio of 100:1:1 to prepare a negative electrode mixture slurry. Both sides of the negative electrode core body made of copper foil were coated with the negative electrode mixture slurry, and the coating film was dried, rolled using a rolling roller, and cut to a predetermined electrode size to obtain a negative electrode in which negative electrode mixture layers were formed on both sides of the negative electrode core body. It is noted that an exposed portion of the negative electrode core body with the surface exposed was arranged in a portion of the negative electrode.

Preparation of Non-Aqueous Electrolyte

Ethylene carbonate (EC), methyl ethyl carbonate (MEC), and dimethyl carbonate (DMC) were mixed in a volume ratio of 3:3:4. A non-aqueous electrolyte was prepared by dissolving lithium hexafluorophosphate ($LiPF_6$) in the mixed solvent at a concentration of 1.2 mol/liter.

Fabrication of Test Cell

An aluminum lead was attached to the exposed portion of the positive electrode including the positive electrode active material of each of Examples 1 to 5 and Comparative Examples 1 to 7, and a nickel lead was attached to the exposed portion of the aforementioned negative electrode, and the positive electrode and the negative electrode were swirlingly wound with a polyolefin separator interposed therebetween to fabricate a wound electrode assembly. This electrode assembly was housed in an outer body, the aforementioned non-aqueous electrolytic solution was injected, and then an opening of the outer body was sealed to obtain a test cell.

Evaluation of Capacity Retention

The following cycle test was carried out for the battery fabricated by incorporating the positive electrode including the positive electrode active material of each of Examples 1 to 5 and Comparative Examples 1 to 7. A discharge capacity of the first cycle of the cycle test and a discharge capacity of the 100th cycle were obtained to calculate the capacity retention by the following formula.

Capacity retention(%)=(100th cycle discharge capacity÷1st cycle discharge capacity)×100

<Cycle Test>

The test cell was charged at a constant current of 0.5 lt under a temperature environment of 45° C. until the battery voltage reached 4.2 V, and then charged at a constant voltage of 4.2 V until the current value reached 1/50 lt. Subsequently, constant current discharge was carried out with a constant current of 0.5 lt until the battery voltage fell down to 2.5 V. This charge/discharge cycle was repeated 100 cycles.

Tables 2 to 7 show the capacity retentions of Examples 1 to 5 and Comparative Examples 1 to 7. Moreover, Tables 2 to 7 also show the amounts of residual Li. The capacity retention of the test cell of Example 1 shown in Table 2 is relatively expressed with the capacity retention of the test cell of Comparative Example 1 being 100%.

The capacity retention of the test cell of Example 2 shown in Table 3 is relatively expressed with the capacity retention of the test cell of Comparative Example 2 being 100%.

The capacity retention of the test cell of Example 3 shown in Table 4 is relatively expressed with the capacity retention of the test cell of Comparative Example 3 being 100%.

The capacity retention of the test cell of Example 4 shown in Table 5 is relatively expressed with the capacity retention of the test cell of Comparative Example 4 being 100%.

The capacity retention of the test cell of Example 5 shown in Table 6 is relatively expressed with the capacity retention of the test cell of Comparative Example 5 being 100%.

The capacity retention of the test cell of Comparative Example 7 shown in Table 7 is relatively expressed with the capacity retention of the test cell of Comparative Example 6 being 100%.

TABLE 2

|  | Capacity retention (%) |
|---|---|
| Example 1 | 101.2 |
| Comparative Example 1 | 100 |

TABLE 3

|  | Capacity retention (%) |
|---|---|
| Example 2 | 101.3 |
| Comparative Example 2 | 100 |

TABLE 4

|  | Capacity retention (%) |
|---|---|
| Example 3 | 101.2 |
| Comparative Example 3 | 100 |

TABLE 5

|  | Capacity retention (%) |
|---|---|
| Example 4 | 101.5 |
| Comparative Example 4 | 100 |

TABLE 6

|  | Capacity retention (%) |
|---|---|
| Example 5 | 101.7 |
| Comparative Example 5 | 100 |

TABLE 7

|  | Capacity retention (%) |
|---|---|
| Comparative Example 6 | 100 |
| Comparative Example 7 | 100 |

In any of Tables 2 to 6, each Example in which the surface modification layer includes Sr exhibited the higher capacity retention than Comparative Example in which the surface modification layer does not include Sr. It is presumed that Al is included in the surface layer in a larger amount than in the main body portion, and further the portion of Al is included in the surface modification layer. In Table 7, since the lithium transition metal composite oxides of both Comparative Example 6 and Comparative Example 7 did not include Al, there was no change in the capacity retention with or without the addition of Sr.

REFERENCE SIGNS LIST 10 non-aqueous electrolyte secondary battery
11 positive electrode
12 negative electrode
13 separator
14 electrode assembly
15 battery case
16 outer can
17 sealing assembly
18, 19 insulating plates
20 positive electrode tab
21 negative electrode tab
22 grooved portion
23 bottom plate
24 lower vent member
25 insulating member
26 upper vent member
27 cap
28 gasket
30 positive electrode current collector
31 positive electrode active material layer
40 negative electrode current collector
41 negative electrode active material layer

The invention claimed is:

1. A positive electrode active material for non-aqueous electrolyte secondary batteries, including:
   a lithium transition metal composite oxide including at least 80 mol % or more of Ni to a total number of mole of metal elements excluding Li, and Al,
   wherein the lithium transition metal composite oxide is represented by a formula: $Li_aNi_xAl_yCo_zM_wO_{2-b}$ wherein in the formula, $0.95 < a < 1.05$, $0.8 \leq x \leq 0.96$, $0 < y \leq 0.10$, $0 \leq z \leq 0.15$, $0 \leq w \leq 0.1$, $0 \leq b < 0.05$, $x+y+z+w=1$, and M is at least one element selected from Mn, Fe, Ti, Si, Nb, Zr, Mo and Zn; and
   a surface modification layer formed on a surface of a primary particle of the lithium transition metal composite oxide and including at least Sr.

2. The positive electrode active material for non-aqueous electrolyte secondary batteries according to claim 1, wherein the surface modification layer further includes Al.

3. The positive electrode active material for non-aqueous electrolyte secondary batteries according to claim 1, wherein
the lithium transition metal composite oxide has a surface layer present on an inner side from a surface and a main body portion present on an inner side of the surface layer, and
a proportion of Al to a total number of mole of metal elements excluding Li in the surface modification layer is larger than a proportion of Al to the total number of mole of metal elements excluding Li in the main body portion.

4. The positive electrode active material for non-aqueous electrolyte secondary batteries according to claim 3, wherein a proportion of Al to a total number of mole of metal elements excluding Li in the surface layer is 1.3 times or more a proportion of Al to a total number of mole of metal elements excluding Li in the main body portion.

5. The positive electrode active material for non-aqueous electrolyte secondary batteries according to claim 1, wherein a proportion of Sr in the surface modification layer is 0.05 mol % to 0.25 mol % to a total number of mole of metal elements excluding Li in the surface modification layer.

6. The positive electrode active material for non-aqueous electrolyte secondary batteries according to claim 1, wherein a proportion of Ni to a total number of mole of metal elements excluding Li in the lithium transition metal composite oxide is 90 mol % or more.

7. The positive electrode active material for non-aqueous electrolyte secondary batteries according to claim 1, wherein an amount of Li remaining on a surface of the lithium transition metal composite oxide is 0.03 wt % to 0.08 wt %.

8. A non-aqueous electrolyte secondary battery, comprising:
a positive electrode including the positive electrode active material for non-aqueous electrolyte secondary batteries according to claim 1;
a negative electrode; and
a non-aqueous electrolyte.

9. A positive electrode active material for non-aqueous electrolyte secondary batteries, including:
a lithium transition metal composite oxide including at least 80 mol % or more of Ni to a total number of mole of metal elements excluding Li, and Al; and
a surface modification layer formed on a surface of a primary particle of the lithium transition metal composite oxide and including at least Sr,
wherein Sr is not dissolved in the lithium transition metal composite oxide.

10. The positive electrode active material for non-aqueous electrolyte secondary batteries according to claim 9, wherein the lithium transition metal composite oxide is represented by a formula: $Li_aNi_xAl_yCo_zM_wO_{2-b}$ wherein in the formula, $0.95<a<1.05$, $0.8\leq x\leq 0.96$, $0<y\leq 0.10$, $0\leq z\leq 0.15$, $0\leq w\leq 0.1$, $0\leq b<0.05$, $x+y+z+w=1$, and M is at least one element selected from Mn, Fe, Ti, Si, Nb, Zr, Mo and Zn.

* * * * *